(12) United States Patent  (10) Patent No.: US 12,328,422 B2
Xia et al.  (45) Date of Patent: Jun. 10, 2025

(54) COLOR CALIBRATION METHOD, IMAGE-FORMING DEVICE, AND COMPUTER-READABLE STORAGE MEDIUM

(71) Applicant: Zhuhai Pantum Electronics Co., Ltd., Zhuhai (CN)

(72) Inventors: Xiangchao Xia, Zhuhai (CN); Zhe Shao, Zhuhai (CN); Tingyu Kou, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 18/486,056

(22) Filed: Oct. 12, 2023

(65) Prior Publication Data
US 2024/0155067 A1 May 9, 2024

(30) Foreign Application Priority Data
Nov. 8, 2022 (CN) .......................... 202211394211.9

(51) Int. Cl.
H04N 1/00 (2006.01)
G06F 3/12 (2006.01)
G06K 15/02 (2006.01)
H04N 1/23 (2006.01)
H04N 1/60 (2006.01)

(52) U.S. Cl.
CPC ....... H04N 1/6033 (2013.01); H04N 1/00915 (2013.01); H04N 1/2323 (2013.01)

(58) Field of Classification Search
None
See application file for complete search history.

(56) References Cited

U.S. PATENT DOCUMENTS

| 7,486,414 B2 | 2/2009 | Arai |
| 2002/0037185 A1* | 3/2002 | Mochimaru ......... G03G 15/232 399/309 |
| 2006/0285862 A1 | 12/2006 | Sakamoto et al. |
| 2010/0021188 A1* | 1/2010 | Mizumukai ........ G03G 15/1605 399/31 |
| 2010/0226695 A1* | 9/2010 | Sato ................... G03G 15/0194 399/301 |
| 2016/0379099 A1* | 12/2016 | Togashi ............... H04N 1/6044 358/1.9 |

(Continued)

FOREIGN PATENT DOCUMENTS

| CN | 1625221 A | 6/2005 |
| CN | 101498906 A | 8/2009 |
| CN | 114236997 * | 3/2022 ........... G03G 15/751 |

(Continued)

*Primary Examiner* — Beniyam Menberu
(74) *Attorney, Agent, or Firm* — ANOVA LAW GROUP PLLC

(57) ABSTRACT

A color calibration method applied to an image-forming device includes: determining whether there is a first task which is an image-forming task being executed or an image-forming task to be executed; when the first task exists, acquiring a size of a first imaging medium corresponding to the first task; determining whether the size of the first imaging medium is within a preset range; and when the size of the first imaging medium is within the preset range, executing the first task and a color calibration task at the same time.

20 Claims, 5 Drawing Sheets

(56) References Cited

U.S. PATENT DOCUMENTS

2021/0409574 A1   12/2021   Oba

FOREIGN PATENT DOCUMENTS

| JP | H0766953 | * | 3/1995 | ............ G03G 15/00 |
| JP | 2008207486 | * | 9/2008 | ................ G06F 3/12 |
| JP | 2008216395 | * | 9/2008 | ............ G03G 21/00 |
| JP | 2009169031 | * | 7/2009 | ............ G03G 15/00 |
| JP | 2010256618 A | | 11/2010 | |
| JP | 2014048338 | * | 3/2014 | ............ G03G 15/01 |

* cited by examiner

COLOR CALIBRATION METHOD, IMAGE-FORMING DEVICE, AND COMPUTER-READABLE STORAGE MEDIUM

CROSS-REFERENCE TO RELATED APPLICATION

This application claims the priority of Chinese Patent Application No. 202211394211.9, filed on Nov. 8, 2022, the content of which is incorporated herein by reference in its entirety.

TECHNICAL FIELD

The present disclosure generally relates to the field of color calibration and, more particularly, relates to a color calibration method, image-forming device and computer-readable storage medium.

BACKGROUND

An image-forming device is a device that prints images or text on imaging media, such as a printer, copier, scanner, fax machine, etc. Since a color image-forming device has a plurality of image-forming units, the plurality of image-forming units form images of various colors and then the images are transferred to an intermediate transfer component or a recording material in an overlapping manner to form multi-color images. When forming a multi-color image, color shifts of multiple colors are prone to occur, resulting in a relative position mismatch between images formed by the plurality of image-forming units. Therefore, the image-forming device often needs to perform color calibration to ensure the quality of image formation. For example, when performing the color calibration, an image-forming device with four toners of black, magenta, cyan, and yellow colors may need to perform concentration detection of the toners and color misregistration detection. In existing technologies, printing tasks and color calibration cannot be performed at the same time. When the color calibration is triggered, the printing tasks must be suspended. Therefore, the overall completion time of printing and color calibration is long, resulting in poor user experience and low printing efficiency.

SUMMARY

One aspect of the present disclosure provides a color calibration method. The method is applied to an image-forming device, and includes: determining whether there is a first task which is an image-forming task being executed or an image-forming task to be executed; when the first task exists, acquiring a size of a first imaging medium corresponding to the first task; determining whether the size of the first imaging medium is within a preset range; and when the size of the first imaging medium is within the preset range, executing the first task and a color calibration task at the same time.

Another aspect of the present disclosure provides an image-forming device. The image-forming device includes a processor, and a memory communicatively connected to the processor and storing a computer program that, when being executed, causes the processor to: determine whether there is a first task for an image-forming device, wherein the first task is an image-forming task being executed or an image-forming task to be executed; when the first task exists, acquire a size of a first imaging medium corresponding to the first task; determine whether the size of the first imaging medium is within a preset range; and when the size of the first imaging medium is within the preset range, execute the first task and a color calibration task at the same time.

Another aspect of the present disclosure provides a non-transitory computer-readable storage medium. The storage medium is configured to store program instructions. When being invoked, the program instructions cause a computer to: determine whether there is a first task, where the first task is an image-forming task being executed or an image-forming task to be executed; when the first task exists, acquire a size of a first imaging medium corresponding to the first task; determine whether the size of the first imaging medium is within a preset range; and when the size of the first imaging medium is within the preset range, execute the first task and a color calibration task at the same time.

In the present disclosure, whether the first task and the color correction task are able to be executed simultaneously is determined by judging whether the size of the first imaging medium of the first task is within the preset range. The preset range may be determined according to the detection device on the intermediate transfer belt. That is, the target area does not overlap with the second imaging area, thereby implementing the first task in the target area and the color correction task in the second imaging area at the same time. Therefore, the use efficiency of the image-forming device and the user experience may be improved.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. The embodiments disclosed herein are exemplary only. Other applications, advantages, alternations, modifications, or equivalents to the disclosed embodiments are obvious to those skilled in the art and are intended to be encompassed within the scope of the present disclosure.

It should be noted that the terms used in the embodiments of the present disclosure are only for the purpose of describing specific embodiments, and are not intended to limit the scope of the present disclosure. As used in the embodiments of the present disclosure and the appended claims, the singular forms such as "a", "said" and "the" are also intended to include the plural forms unless the context clearly indicates otherwise.

In the present disclosure, when a size of a first imaging medium corresponding to a first task is within a preset range, it may be determined that the imaging medium is not in an imaging area of a color calibration task. Therefore, the first task and the color calibration task may be performed simultaneously, improving the utilization efficiency of the image-forming device and the user experience.

Figure 1:
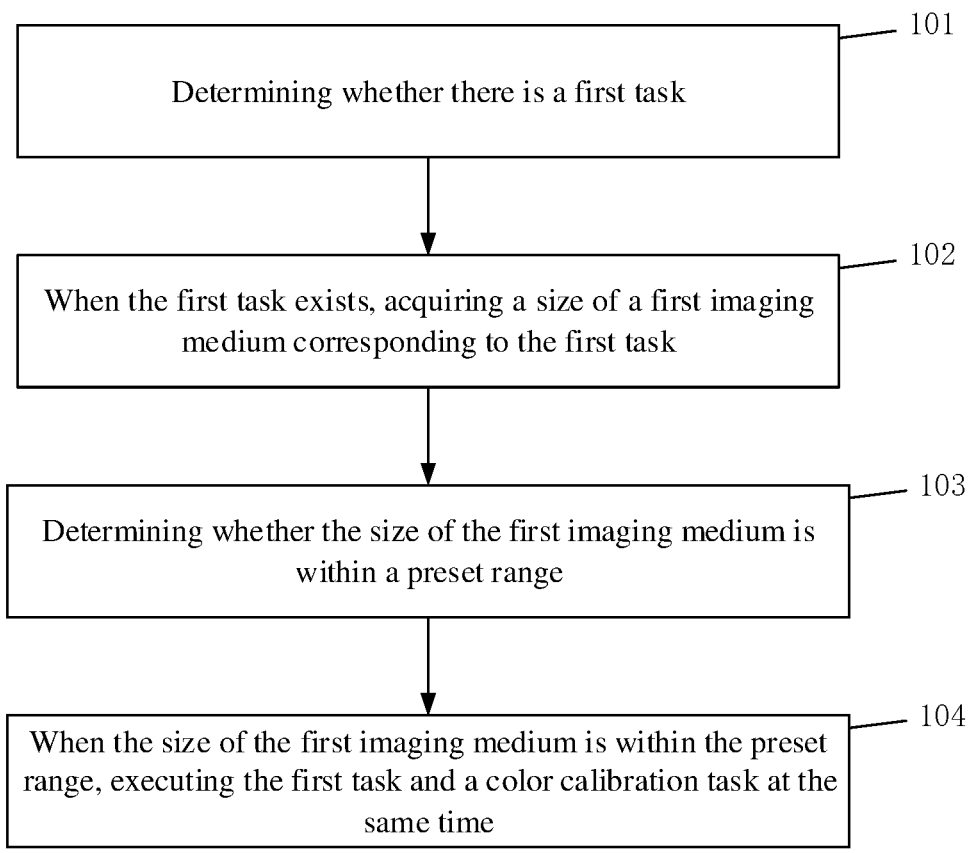
FIG. 1 illustrates a flowchart of an exemplary color calibration method according to various disclosed embodiments of the present disclosure.

The present disclosure provides a color calibration method. In one embodiment as shown in FIG. 1, an exemplary color calibration method may include S101 to S104.

In S101, it may be determined whether there is a first task. The first task may be an image-forming task being executed or an image-forming task to be executed. For example, the first task may be a printing task, a copying task, a scanning task, etc. The printing task may include at least one job to be printed. The color calibration task may include that the image-forming device first forms a specified toner image on a transfer belt, an image density sensor is used to detect the toner image on the transfer belt, and then color calibration is performed according to detection results. The printing task may need to form a specified image on an image-forming medium, which may conflict with the formation of a specified toner image on the transfer belt in the color calibration task. In the existing technologies, the printing task and color calibration task are performed separately.

Color calibration includes multiple types, such as color registration calibration, density calibration, etc. Density calibration usually includes developing voltage calibration (i.e., DEV calibration), laser scanning unit (LSU) optical power calibration (e.g., laser diode (LD) light intensity calibration), or gamma calibration (halftone calibration).

Color registration calibration, that is, color registration inaccurate calibration, is used to make sure that positions of four colors of CMYK printed by the image-forming device are able to be aligned, to ensure that the image is able to be properly registered.

DEV calibration uses an image density control (IDC) sensor to detect the image on the transfer belt, collect data about image density, and perform image calibration. The different depth of the image corresponds to different image density. Because of the difference in the voltage of a developing roller (DEV) of a toner box, it is necessary to determine an appropriate development voltage (DEV) according to the image density. Therefore, the DEV calibration is required.

LD light intensity calibration (LSU light power calibration) is used to correct the light power of a laser scanning unit (LSU), such that LSU uses appropriate light power for exposure.

Gamma Calibration is used to adjust halftone processing parameters of an image.

For description purposes only, the color registration calibration will be used as an example to illustrate the present disclosure.

The copy task mainly includes two steps. The image on an original to be copied may be acquired first. Then, imaging may be performed on the imaging medium according to the acquired image on the original to be copied. Although imaging is not involved in the first step, it may be theoretically possible to perform the first step of the copying task and the color calibration task simultaneously. For the scanning task, since it does not involve printing paper, it does not conflict with the color calibration task. When the first task is the scanning task, the scanning task and the color calibration task may be able to be executed simultaneously.

In S101, when the color calibration task needs to be performed, it may be determined whether the color calibration task is able to be performed immediately by determining whether the first task exists. Since the color calibration task takes a long time, when the first task exists, further judgment may be required to determine whether the color calibration task is able to be performed immediately, to avoid poor user experience caused by the long waiting time of the first task.

In S102, when there is the first task, a size of a first imaging medium corresponding to the first task may be acquired. The imaging medium may include a paper, a coated paper, a copy paper, a film, and so on. Since the scanning task does not involve imaging, there may be no need to obtain the size of the first imaging medium when the first task is a scanning task, and the first task and the color calibration task may be directly executed simultaneously. As for the size of the first imaging medium, taking a paper as an example, currently commonly used printing paper size include A4, A5, or B5. In this step, when there is the first task, it may be determined whether the first task and the color calibration task are able to be executed simultaneously by acquiring the size of the first imaging medium corresponding to the first task.

In S103, it may be determined whether the size of the first imaging medium is within a preset range. The preset range may be used to determine whether an imaging area of the first task overlaps with an imaging area of the color calibration task. When the size of the first imaging medium is within the preset range, it may be determined that the imaging area of the first task and the imaging area of the color calibration task do not overlap, and the color calibration task and the first task may be able to be performed simultaneously. In some embodiments, whether the size of the first imaging medium is within a preset range may be determined according to the length, width or area of the first imaging medium. For example, it may be determined that the size of the first imaging medium is within a preset range when the length of the first imaging medium is less than or equal to a preset length. In another embodiment, it may be determined that the size of the first imaging medium is within a preset range when the width of the first imaging medium is less than or equal to a preset width. In another embodiment, it may be determined that the size of the first imaging medium is within a preset range when the area of the first imaging medium is less than or equal to a preset area.

In S103, it may be determined whether the first task and the color calibration task are able to be performed simultaneously by comparing the size of the first imaging medium with the preset range. When the size of the first imaging medium is smaller than the preset range, it may be determined that the imaging area of the first task does not overlap with the imaging area corresponding to the color calibration task.

In S104, when the size of the first imaging medium is within the preset range, the first task and the color calibration task may be executed simultaneously. The color calibration task may be triggered in multiple ways. Taking a printer as an example, the triggering conditions of the color calibration task may include: the temperature of a heating component is lower than a preset temperature, the printer is restarted after being shut down, the ambient temperature or humidity of the printer exceeds a preset threshold, after replacing parts or belts of the printer, the user manually triggers color calibration, or the image-forming device automatically triggers according to actual needs during printing. Optionally, for a laser printer, the triggering conditions of the color calibration task may further include: after replacing toner cartridges of the printer, or after filling toner cartridge with toner. For an inkjet printer, the triggering conditions of the color calibration task may further include different triggering conditions after replacing ink cartridges of the printer. In S104, by executing the first task and the color calibration task at the same time, the operation time may be reduced, and the use efficiency of the image-forming device may be improved. Therefore, the user experience may be improved.

Optionally, when the size of the first imaging medium is not within the preset range, the first task may be performed first, and the color calibration task may be performed after the first task is completed. Alternatively, according to the specific settings of the user, the color calibration task may be performed first and then the first task may be performed, thereby ensuring the print quality of the first task.

After the color calibration task is executed, the execution result of the color calibration task may also be obtained, and the execution result may include calibration parameters. Afterward, the calibration parameters may be saved, and the configuration information of the image-forming device may be adjusted according to the calibration parameters, to complete the color calibration.

In some embodiments, the method may further include determining whether the first task is able to print within a target area, and then determining whether the size of the first imaging medium is within the preset range. The first imaging area may be determined according to the maximum imaging medium size supported by the image-forming device. For example, when the image-forming device is an A4 paper printer, the maximum supported imaging medium size may be the size of the A4 paper. The first imaging area may include the target area. When the first task is able to print within the target area, it may be determined that the size of the first imaging medium is within the preset range. That is, when the image-forming device is an A4 paper printer, the size of the first imaging area may be A4 size. When the size of the dispatched print job is A5 size, the size of the dispatched print job is smaller than the size of the first imaging area. Therefore, when the formed image is not in a second imaging area corresponding to the color calibration task when the print job is printed, it may be determined that the size of the first imaging medium is within the preset range.

When performing the color calibration, it may be necessary to print a preset calibration image first, and then the color calibration may be performed according to the preset calibration image. The calibration image may be often not directly printed on an imaging medium such as a paper, but may be formed on a transfer belt. Take a laser printer as an example, the laser printer usually performs color print jobs based on toners in four colors of black, magenta, cyan, and yellow. When performing the color calibration, it may be necessary to perform toner density detection and color registration inaccurate detection.

The image-forming device may be provided with an intermediate transfer belt, and a detection device may be provided on the intermediate transfer belt. The position of the second imaging area may be determined according to the detection area of the detection device. The image-forming device may perform the specific color calibration by detecting the preset calibration image on the intermediate transfer belt through the detection device. The detection device may be implemented in the form of a counterpoint sensor or the like. Therefore, the color calibration area may be usually fixed, that is, the position of the second imaging area may be fixed and determined according to the specific detection area of the detection device. When the size of the first imaging medium is larger than the target area and the first task and the color calibration task are performed simultaneously, there may be a case where a portion of the preset calibration image is formed on the paper.

Figure 2:
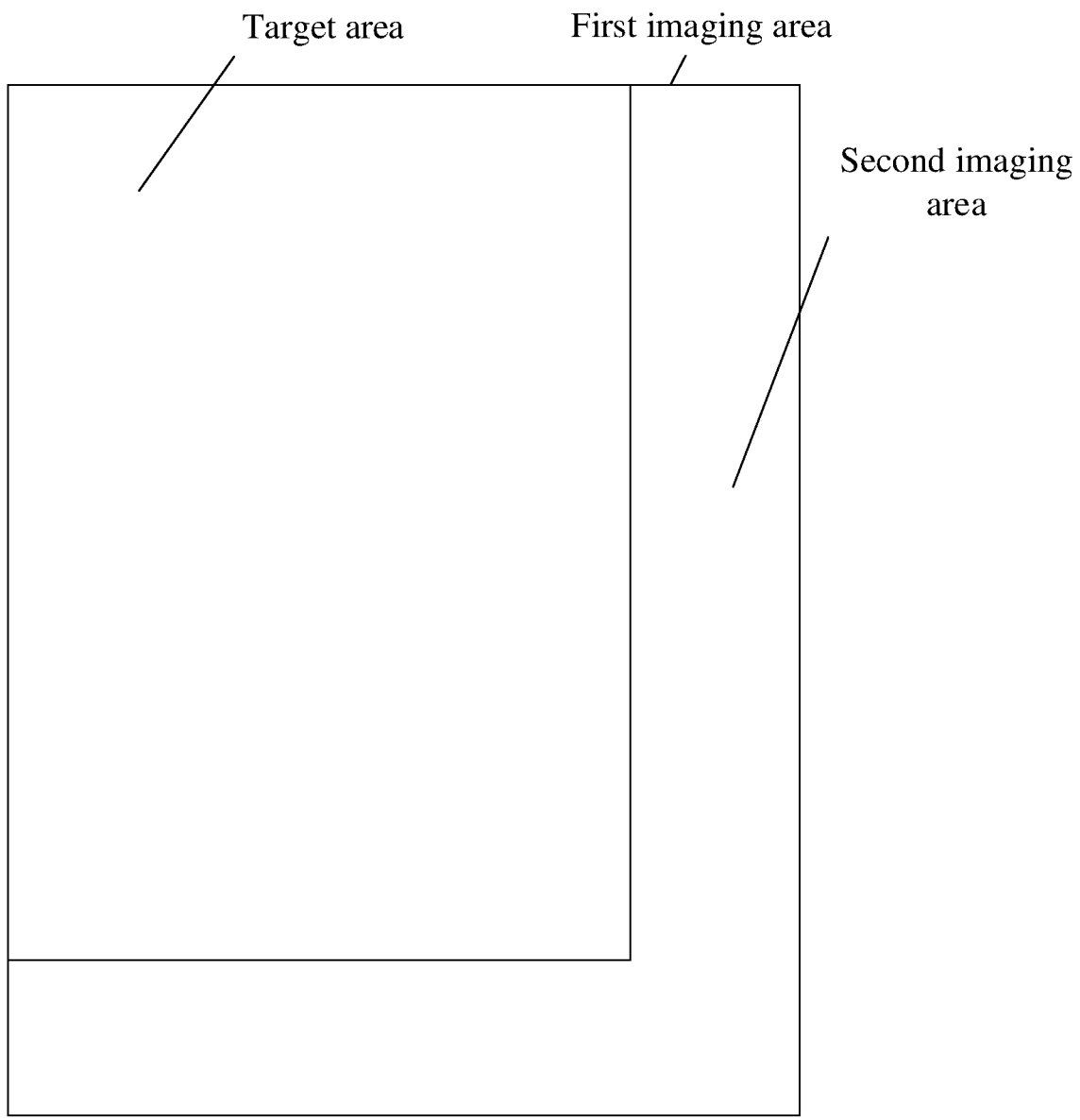
FIG. 2 illustrates an exemplary first image-forming area according to various disclosed embodiments of the present disclosure.

For example, in an A4 printer, the size of the first imaging area may be the size of an A4 paper (that is, a rectangle with a length of 297 mm and a width of 210 mm). The intermediate transfer belt may be slightly larger than the first imaging area. When there are two detection devices located on adjacent sides of the intermediate transfer belt, a projection area of the detection area of the detection devices projected on the first imaging area may be the second imaging area. For example, the detection devices may be located on the right side and the lower side of the intermediate transfer belt. In another embodiment, the detection devices may be located on the left side and the upper side of the intermediate transfer belt. A portion except the second imaging area may be the target area. FIG. 2 is a schematic diagram of the first imaging area provided by one embodiment of the present disclosure. As shown in FIG. 2, when the detection devices are respectively located on the right side and the lower side of the intermediate transfer belt, positions of the detection areas projected to the first imaging area may be also on the right side and the lower side. Then the upper left portion of the first imaging area except the second imaging area on the right side and the lower side may be the target area.

Figure 3:
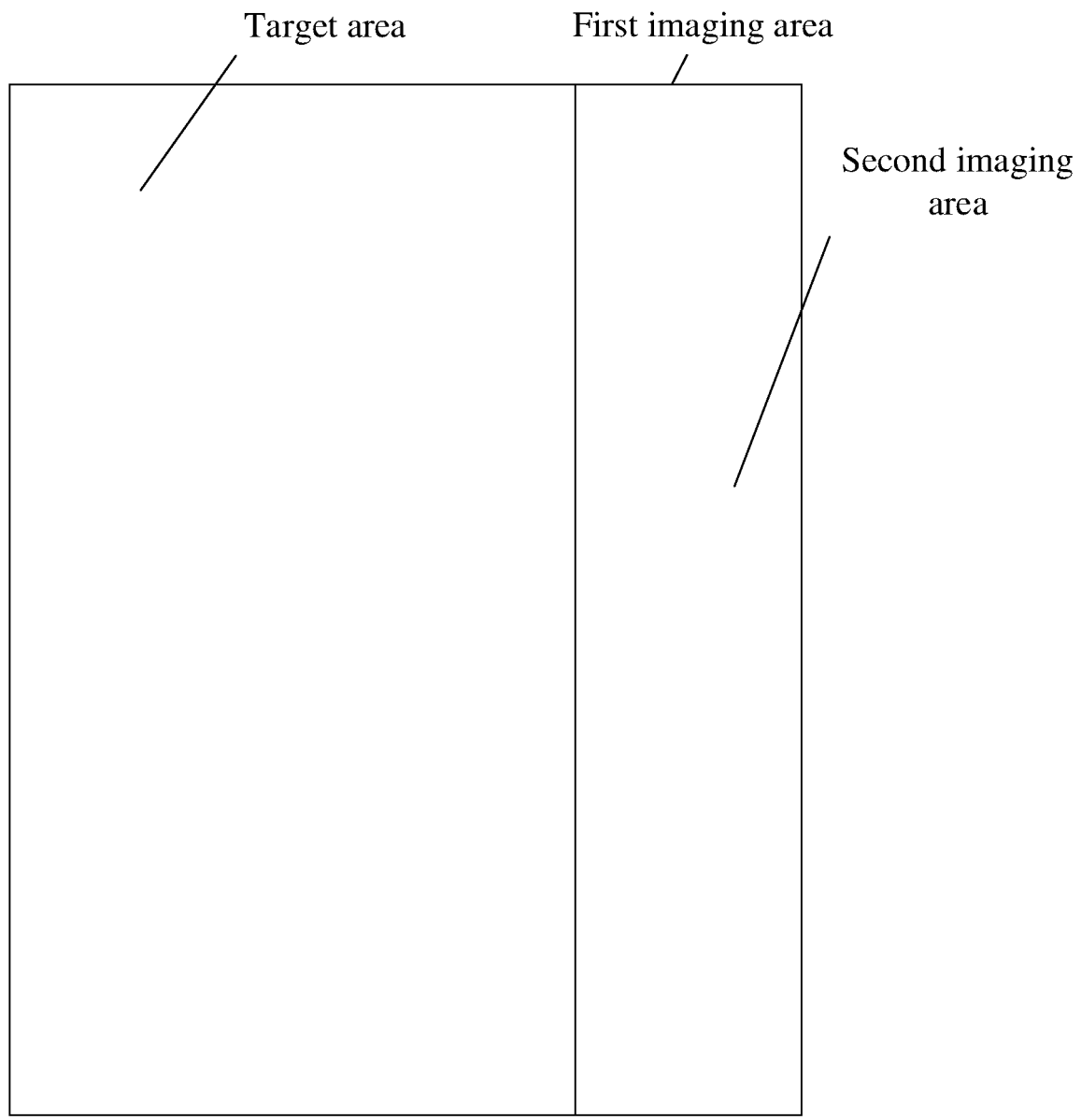
FIG. 3 illustrates another exemplary first image-forming area according to various disclosed embodiments of the present disclosure.

In another embodiment, there may be only one detecting device, and it may be arranged on either side of the intermediate transfer belt. FIG. 3 is a schematic diagram of another first imaging area provided by another embodiment of the present disclosure. As shown in FIG. 3, the second imaging area may be the right part of the first imaging area. That is, the detection device may be arranged on the right side of the intermediate transfer belt.

Figure 4:
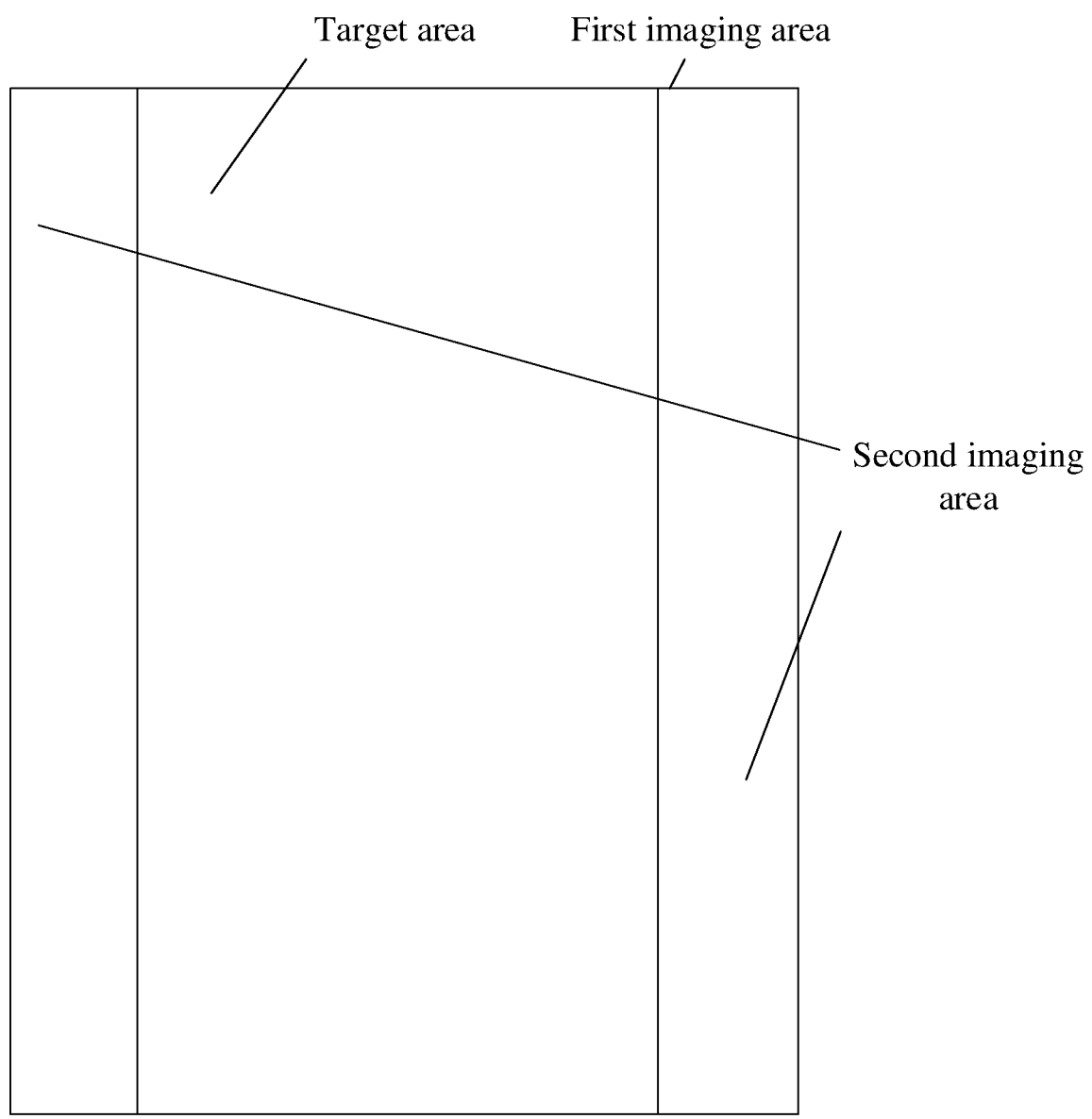
FIG. 4 illustrates another exemplary first image-forming area according to various disclosed embodiments of the present disclosure.

In another embodiment, the detection devices may also be respectively arranged on opposite sides of the intermediate transfer belt. For example, the detection devices may be located on the upper side and the lower side of the intermediate transfer belt, and the detection areas may be also located on the upper side and the lower side of the intermediate transfer belt. Therefore, the second imaging area of the detection areas projected into the first imaging area may be also located on the upper and lower sides of the first imaging area. In another embodiment, the detection devices may be located on the left and right sides of the intermediate transfer belt. Then the detection areas may be also located on the left side and the right side of the intermediate transfer belt, and the second imaging area projected from the detection areas to the first imaging area may be located on the left side and the right side of the first imaging area. FIG. 4 is a schematic diagram of another first imaging area provided by an embodiment of the present disclosure. As shown in FIG. 4, the second imaging area may be located on the left and right sides of the first imaging area, and the middle part of the first imaging area except the second imaging area may be the target area.

When performing the first task and the color calibration task at the same time, the first task may be performed on the target area. And, the preset color calibration image may be imaged in the second imaging area, and the color calibration task may be performed according to the color calibration image.

In one embodiment, the image-forming device may be a printer, and the largest paper that can be printed may be A4. Therefore, the printing task and the color calibration task of the imaging medium including A5 papers or papers below A5 size may be able to be executed at the same time.

In some embodiments, when a new image-forming task is received and while the color calibration task is not completed, the new image-forming task may be performed after the color calibration task is completed.

Figure 5:
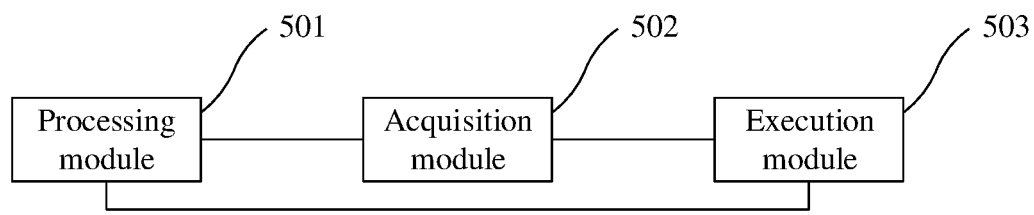
FIG. 5 illustrates an exemplary image-forming device according to various disclosed embodiments of the present disclosure.

The present disclosure also provides an imaging forming device. As shown in FIG. 5, in one embodiment, the imaging forming device may include a processing module 501, an acquisition module 502, and an execution module 503.

The processing module 501 may be configured to determine whether there is a first task. The first task may be an image-forming task being executed or an image-forming task to be executed.

The acquisition module 502 may be configured to obtain a size of a first imaging medium corresponding to the first task when the first job exists.

The processing module 501 may be further configured to determine whether the size of the first imaging medium is within a preset range.

The execution module 503 may be configured to simultaneously execute the first task and the color calibration task when the size of the first imaging medium is within the preset range.

The image-forming device presented by the embodiment shown in FIG. 5 may be configured to execute the methods provided by various embodiments of the present disclosure shown in FIG. 1 to FIG. 4 and may have benefits of these method embodiments.

In some embodiments, the processing module 501 may be specifically configured to: determine whether the first task is able to be printed in a target area. The first imaging area may be determined according to the maximum size of the imaging medium supported by the image-forming device, and the first imaging area may include the target area and a second imaging area corresponding to the color calibration task. When the first task is able to be printed within the target area, it may be determined that the size of the first imaging medium is within the preset range.

In some embodiments, the executing module 503 may be specifically configured to: execute the first task in the target area, image a preset color calibration image in the second imaging area, and execute the color calibration task according to the color calibration image.

In some embodiments, an intermediate transfer belt may be disposed in the image-forming device, and a detection device may be disposed on the intermediate transfer belt. The position of the second imaging area may be determined according to the detection area of the detection device.

In some embodiments, the execution module 503 may be further configured to: execute the first task; and after confirming that the execution of the first task is completed, perform the color calibration task.

In some embodiments, the processing module 501 may be further configured to: when a new image-forming task is received when the color calibration task is not completed, wait for the color calibration task to be completed before performing the new image-forming task.

In some embodiments, the acquisition module 502 may be further configured to acquire an execution result of the color calibration task, where the execution result includes calibration parameters. The processing module 501 may be further configured to adjust the configuration information of the image-forming device according to the calibration parameters.

The present disclosure also provides an electronic device. In one embodiment shown in FIG. 6, an electronic device may include at least one processor and at least one memory connected with the at least one processor in communication. The at least one memory may be configured to store program instructions that are able to be executed by the at least one processor, and the at least one processor may call the above-mentioned program instructions to execute the color calibration method provided by the embodiments shown in FIGS. 1-4 of the present disclosure.

Figure 6:
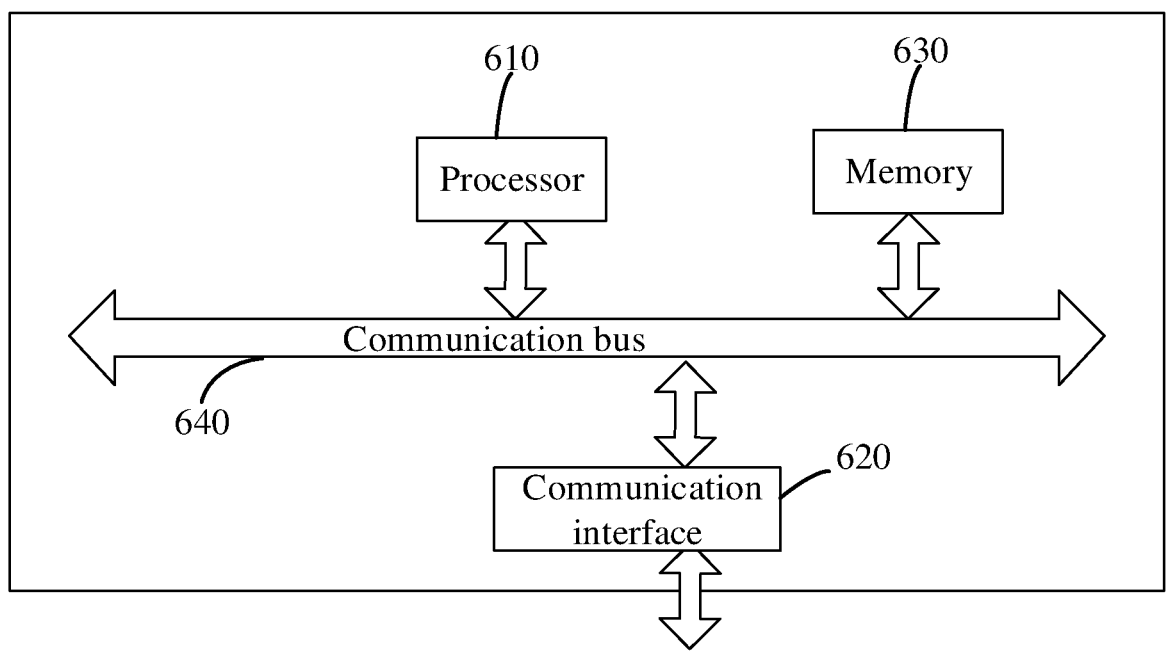
FIG. 6 illustrates an exemplary electronic device according to various disclosed embodiments of the present disclosure.

As shown in FIG. 6, in one embodiment, the electronic device may be embodied as a form of a general-purpose computing device. The electronic device may include, but is not limited to: one or more processors 610, a communication interface 620, a memory 630, and a communication bus 640 connecting different system components (including the memory 630, the communication interface 620 and the one or more processor 610).

The communication bus 640 may include one or more of several types of bus structures, including a memory bus or a memory controller, a peripheral bus, an accelerated graphics port, a processor or a local bus using any of a variety of bus structures. For example, these architectures include but are not limited to Industry Standard Architecture (ISA) bus, Micro Channel Architecture (MAC) bus, enhanced ISA bus, Video Electronics Standards Association (VESA) local bus, or Peripheral Component Interconnection (PCI) bus.

The electronic device may typically include a variety of computer system readable media. These media may be any available media that are able to be accessed by the electronic device and include both volatile or nonvolatile media, removable or non-removable media.

The memory 630 may include a computer system-readable medium in the form of a volatile memory, such as a random access memory (RAM) and/or a cache memory. The electronic device may further include other removable/non-removable, volatile/nonvolatile computer system storage media. The memory 630 may include at least one program product and the programing product may include a set (for example, at least one) of program modules configured to execute the functions of the various embodiments of the present disclosure.

The program or utility including a set (at least one) of program modules may be stored in memory 630. The set of program modules may include, but is not limited to—an operating system, one or more application programs, other program modules, or program data. Each or some combination of these examples may include implementations of network environments. The set of program modules usually execute the functions and/or methods in the embodiments described in the present disclosure.

The one or more processor 610 may execute various functional applications and data processing by running the programs stored in the memory 630, such as implementing the color calibration method provided by the embodiments shown in FIGS. 1-4 of the present disclosure.

The present disclosure also provides a computer-readable storage medium. The computer-readable storage medium may be configured to store computer instructions, and the computer instructions may dictate the computer to execute the color calibration method provided in the embodiments shown in FIGS. 1-4 of the present disclosure.

Any combination of one or more computer-readable storage media may be used to form the above-mentioned computer-readable storage medium. The computer-readable medium may be a computer-readable signal medium or a computer readable storage medium. A computer readable storage medium may be, for example, but is not limited to, an electrical, magnetic, optical, electromagnetic, infrared, or semiconductor system, component or device, or any combination thereof. More specific examples (non-exhaustive list) of computer-readable storage media include: portable computer disks, hard disks, Random Access Memory (RAM), Read Only Memory (ROM), erasable programmable read-only memory (EPROM) or flash memory, optical fiber, portable compact disk read-only memory (CD-ROM), optical storage devices, magnetic memory components, or any suitable combination of the above. In the present disclosure, the computer-readable storage medium may be any tangible medium that contains or stores a program that can be used by or in conjunction with an instruction execution system, apparatus, or device.

The embodiments disclosed herein are exemplary only. Other applications, advantages, alternations, modifications, or equivalents to the disclosed embodiments are obvious to those skilled in the art and are intended to be encompassed within the scope of the present disclosure. In some cases, the actions or steps recited in the present disclosure may be performed in an order different from that in the embodiments and still achieve desirable results. In addition, the processes depicted in the accompanying figures do not necessarily require the particular order shown, or sequential order, to achieve desirable results. Multitasking and parallel processing may be also possible or may be advantageous in certain embodiments.

In the present disclosure, the terms including "one embodiment", "some embodiments", "example", "specific examples", or "some examples" mean that a particular feature, structure, material, or characteristic described in connection with the embodiments or examples may be included in at least one embodiment or example of the present disclosure. In the present disclosure, the schematic representations of the above terms are not necessarily directed to the same embodiment or example. Furthermore, the described specific features, structures, materials or characteristics may be combined in any suitable manner in any one or more embodiments or examples. In addition, those skilled in the art may combine different embodiments or examples and features of different embodiments or examples described in this specification without conflicting with each other.

The terms "first" and "second" are used for descriptive purposes only, and cannot be understood as indicating or implying relative importance or implicitly specifying the quantity of indicated technical features. Thus, the features defined as "first" and "second" may explicitly or implicitly include at least one of these features. In the present disclosure, "plurality" means at least two, such as two, three, etc., unless otherwise specifically defined.

Any process or method descriptions in flowcharts or otherwise described herein may be understood to represent modules, segments or portions of code comprising one or more executable instructions for implementing custom logical functions or steps of a process, and the scope of preferred embodiments of this specification includes alternative implementations in which functions may be performed out of the order shown or discussed, including in substantially simultaneous fashion or in reverse order depending on the functions involved.

Depending on the context, the word "if" as used herein may be interpreted as "at" or "when" or "in response to determining" or "in response to detecting". Similarly, depending on the context, the phrases "if determined" or "if detected (the stated condition or event)" could be interpreted as "when determined" or "in response to the determination" or "when detected (the stated condition or event))" or "in response to detection of (stated condition or event)".

In the present disclosure, the device may include, but is not limited to, a personal computer (PC), a personal digital assistant (PDA), a wireless handheld device, a tablet computer, a mobile phone, an MP3 monitor, an MP4 monitor, etc.

In the present disclosure, the disclosed systems, devices or methods can be implemented in other ways. For example, the device embodiments described above are only illustrative. For example, the division of the units is only a logical function division. In actual implementation, there may be other division methods. For example, multiple units or components may be combined or may be integrated into another system, or some features may be ignored or not implemented. In another point, the mutual coupling or direct coupling or communication connection shown or discussed may be through some interfaces, and the indirect coupling or communication connection of devices or units may be in electrical, mechanical or other forms.

Each functional unit in each embodiment of the present disclosure may be integrated into one processing unit, or each unit may exist separately physically, or two or more units may be integrated into one unit. The above-mentioned integrated units can be implemented in the form of hardware, or in the form of hardware plus software functional units.

The integrated units implemented in the form of software functional units may be stored in a computer-readable storage medium. The above-mentioned software functional units may be stored in a storage medium, including several instructions to enable a computer device (which may be a personal computer, a connector, or a network device, etc.) or a processor to execute a portion of the methods described in each embodiment of the present disclosure. The aforementioned storage media may include medium that can store program code such as a flash disk, a mobile hard disk, read-only memory (ROM), random access memory (RAM), magnetic disk or optical disc, etc.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A color calibration method applied to an image-forming device, comprising:
    determining whether there is a first task, wherein the first task is an image-forming task being executed or an image-forming task to be executed;
    when the first task exists, acquiring a size of a first imaging medium corresponding to the first task;
    determining whether the size of the first imaging medium is within a preset range; and
    when the size of the first imaging medium is within the preset range, executing the first task and a color calibration task at the same time, wherein the first task is output in a target area of a first imaging area and the color calibration task is output in a second imaging area of the first imaging area, a position of the second imaging area is determined by at least one counterpoint sensor of the image-forming device,
wherein
the image-forming device includes an intermediate transfer belt, the intermediate transfer belt being larger than the first imaging area;
the image-forming device includes two detection devices located on adjacent sides of the intermediate transfer belt;
a projection area of a detection area of the two detection devices projected on the first imaging area is the second imaging area; and
the adjacent sides of the intermediate transfer belt include a right side and a lower side of the intermediate transfer belt, or a left side and an upper side of the intermediate transfer belt.

2. The method according to claim 1, wherein determining whether the size of the first imaging medium is within the preset range includes:
determining whether the first task is able to be printed within the target area; wherein the first imaging area is determined according to a maximum imaging medium size supported by the image-forming device and the first imaging area includes the target area and the second imaging area corresponding to the color calibration task; and
when the first task is able to be printed within the target area, determining that the size of the first imaging medium is within the preset range;
wherein whether the size of the first imaging medium is within a preset range is determined according to a length, a width or an area of the first imaging medium, and wherein when the length of the first imaging medium is less than or equal to a preset length, or when the width of the first imaging medium is less than or equal to a preset width, or when the area of the first imaging medium is less than or equal to a preset area, the size of the first imaging medium can be determined to be within the preset range.

3. The method according to claim 2, wherein:
a position of the second imaging area is determined according to the detection area of the two detection devices.

4. The method according to claim 1, wherein executing the first task and the color calibration task at the same time includes:
performing the first task in the target area, and
imaging a preset color calibration image in-the second imaging area, and performing the color calibration task according to the preset color calibration image.

5. The method according to claim 1, when the size of the first imaging medium is not within the preset range, further comprising:
executing the first task; and
after the first task is finished, executing the color calibration task.

6. The method according to claim 1, after executing the first task and the color calibration task at the same time, further comprising:
when a new image-forming task is received and when the color calibration task is not completed, waiting until the color calibration task is completed before executing the new image-forming task.

7. The method according to claim 1, further comprising:
acquiring an execution result of the color calibration task, wherein the execution result includes calibration parameters; and
adjusting configuration information of the image-forming device according to the calibration parameters.

8. An image-forming device, comprising:
a processor, and
a memory communicatively connected to the processor and storing a computer program that, when being executed, causes the processor to:
determine whether there is a first task for an image-forming device, wherein the first task is an image-forming task being executed or an image-forming task to be executed;
when the first task exists, acquire a size of a first imaging medium corresponding to the first task;
determine whether the size of the first imaging medium is within a preset range;
and
when the size of the first imaging medium is within the preset range, execute the first task and a color calibration task at the same time, wherein the first task is output in a target area of a first imaging area and the color calibration task is output in a second imaging area of the first imaging area, a position of the second imaging area is determined by at least one counterpoint sensor of the image-forming device,
wherein
the image-forming device includes an intermediate transfer belt, the intermediate transfer belt being larger than the first imaging area;
the image-forming device includes two detection devices located on adjacent sides of the intermediate transfer belt;
a projection area of a detection area of the two detection devices projected on the first imaging area is the second imaging area; and
the adjacent sides of the intermediate transfer belt include a right side and a lower side of the intermediate transfer belt, or a left side and an upper side of the intermediate transfer belt.

9. The image-forming device according to claim 8, wherein the processor is further configured to:
determine whether the first task is able to be printed within the target area; wherein the first imaging area is determined according to a maximum imaging medium size supported by the image-forming device and the first imaging area includes the target area and the second imaging area corresponding to the color calibration task; and
when the first task is able to be printed within the target area, determine that the size of the first imaging medium is within the preset range;
wherein whether the size of the first imaging medium is within a preset range is determined according to a length, a width or an area of the first imaging medium, and wherein when the length of the first imaging medium is less than or equal to a preset length, or when the width of the first imaging medium is less than or equal to a preset width, or when the area of the first imaging medium is less than or equal to a preset area, the size of the first imaging medium can be determined to be within the preset range.

10. The image-forming device according to claim 9, wherein:
a position of the second imaging area is determined according to the detection area of the two detection devices.

11. The image-forming device according to claim 8, wherein the processor is further configured to:

perform the first task in the target area, and image a preset color calibration image in the second imaging area, and perform the color calibration task according to the preset color calibration image.

12. The image-forming device according to claim 8, wherein, when the size of the first imaging medium is not within the preset range, the processor is further configured to:

execute the first task; and after the first task is finished, execute the color calibration task.

13. The image-forming device according to claim 8, wherein the processor is further configured to:

when a new image-forming task is received and when the color calibration task is not completed, wait until the color calibration task is completed before the new image-forming task is executed.

14. The image-forming device according to claim 8, wherein the processor is further configured to:

acquire an execution result of the color calibration task, wherein the execution result includes calibration parameters; and adjust configuration information of the image-forming device according to the calibration parameters.

15. A non-transitory computer-readable storage medium, wherein:

the computer-readable storage medium is configured to store program instructions; and when the program instructions are invoked by a computer, the computer is configured to:

determine whether there is a first task for an image-forming device, wherein the first task is an image-forming task being executed or an image-forming task to be executed;

when the first task exists, acquire a size of a first imaging medium corresponding to the first task;

determine whether the size of the first imaging medium is within a preset range;

and when the size of the first imaging medium is within the preset range, execute the first task and a color calibration task at the same time, wherein a first task is output in a target area of the first imaging area and the color calibration task is output in a second imaging area of the first imaging area, a position of the second imaging area is determined by at least one counterpoint sensor of the image-forming device, wherein the image-forming device includes an intermediate transfer belt, the intermediate transfer belt being larger than the first imaging area;

the image-forming device includes two detection devices located on adjacent sides of the intermediate transfer belt;

a projection area of a detection area of the two detection devices projected on the first imaging area is the second imaging area; and the adjacent sides of the intermediate transfer belt include a right side and a lower side of the intermediate transfer belt, or a left side and an upper side of the intermediate transfer belt.

16. The computer-readable storage medium according to claim 15, wherein the computer is further configured to:

determine whether the first task is able to be printed within the target area; wherein the first imaging area is determined according to a maximum imaging medium size supported by the image-forming device and the first imaging area includes the target area and the second imaging area corresponding to the color calibration task; and when the first task is able to be printed within the target area, determine that the size of the first imaging medium is within the preset range;

wherein whether the size of the first imaging medium is within a preset range is determined according to a length, a width or an area of the first imaging medium, and wherein when the length of the first imaging medium is less than or equal to a preset length, or when the width of the first imaging medium is less than or equal to a preset width, or when the area of the first imaging medium is less than or equal to a preset area, the size of the first imaging medium can be determined to be within the preset range.

17. The computer-readable storage medium according to claim 16, wherein:

a position of the second imaging area is determined according to the detection area of the two detection devices.

18. The computer-readable storage medium according to claim 15, wherein the computer is further configured to:

perform the first task in the target area, and image a preset color calibration image in the second imaging area, and performing the color calibration task according to the preset color calibration image.

19. The computer-readable storage medium according to claim 15, wherein, when the size of the first imaging medium is not within the preset range, the computer is further configured to:

execute the first task; and after the first task is finished, execute the color calibration task.

20. The computer-readable storage medium according to claim 15, wherein the computer is further configured to:

when a new image-forming task is received and when the color calibration task is not completed, wait until the color calibration task is completed before the new image-forming task is executed.

* * * * *